(12) United States Patent
Asou et al.

(10) Patent No.: US 7,999,423 B2
(45) Date of Patent: Aug. 16, 2011

(54) MOTOR, PUMP, AND METHOD OF MANUFACTURING THE MOTOR

(75) Inventors: Hiroki Asou, Tokyo (JP); Mamoru Kawakubo, Tokyo (JP); Mineo Yamamoto, Tokyo (JP); Hiroyuki Ishii, Tokyo (JP); Tougo Yamazaki, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 12/872,196

(22) Filed: Aug. 31, 2010

(65) Prior Publication Data
US 2010/0320848 A1   Dec. 23, 2010

Related U.S. Application Data

(62) Division of application No. 12/067,862, filed as application No. PCT/JP2007/058489 on Apr. 19, 2007.

(51) Int. Cl.
*H02K 1/04* (2006.01)
(52) U.S. Cl. .......................................... 310/43; 310/89
(58) Field of Classification Search .................. 310/43, 310/71, 78–91, 216.067
See application file for complete search history.

(56) References Cited

U.S. PATENT DOCUMENTS

| | | | |
|---|---|---|---|
| 2,668,925 A * | 2/1954 | Bloser | 310/412 |
| 3,867,658 A | 2/1975 | Dochterman | |
| 3,874,073 A * | 4/1975 | Dochterman et al. | 29/598 |
| 3,997,232 A * | 12/1976 | Dunaway | 310/68 R |
| 4,015,154 A | 3/1977 | Tanaka et al. | |
| 4,219,748 A | 8/1980 | Sakaguchi et al. | |
| 4,387,313 A | 6/1983 | Yamamoto et al. | |
| 4,437,027 A * | 3/1984 | Yamamoto et al. | 310/78 |
| 4,456,844 A | 6/1984 | Yamamoto et al. | |
| 5,532,533 A * | 7/1996 | Mizutani | 310/68 B |
| 6,081,056 A * | 6/2000 | Takagi et al. | 310/89 |
| 6,404,086 B1 * | 6/2002 | Fukasaku et al. | 310/89 |
| 6,570,284 B1 * | 5/2003 | Agnes et al. | 310/89 |
| 6,577,030 B2 * | 6/2003 | Tominaga et al. | 310/68 B |
| 6,608,414 B1 * | 8/2003 | Conley | 310/89 |
| 6,756,713 B2 * | 6/2004 | Diehl et al. | 310/71 |

(Continued)

FOREIGN PATENT DOCUMENTS

| | | |
|---|---|---|
| EP | 1 363 026 | 11/2003 |
| JP | 60-042624 | 3/1985 |
| JP | 5-23773 U | 3/1993 |

(Continued)

OTHER PUBLICATIONS

Decision of Rejection (Japanese Final Office Action) dated Sep. 7, 2010, issued in the corresponding Japanese Patent Application No. 2007-528903, and an English Translation thereof.

(Continued)

*Primary Examiner* — Thanh Lam
(74) *Attorney, Agent, or Firm* — Buchanan Ingersoll & Rooney PC

(57) ABSTRACT

An object is to provide a motor that is designed to reduce the parts costs and the processing costs, without additional parts for fixing, by incorporating a fan cover, a condenser assembly box, and a foot plate into a molded stator. A motor 200 according to this invention has a stator 100, which is molded of a thermosetting resin as a molded stator 11. The motor 200 is characterized in that the molded stator 11 includes a foot plate mounting portion 13 where a foot plate 19 is mounted, and in that prepared holes for screw fixing of the foot plate 19 are exposed from a mold surface at the foot plate mounting portion 13.

4 Claims, 5 Drawing Sheets

U.S. PATENT DOCUMENTS

| | | | |
|---|---|---|---|
| 7,151,333 B2 * | 12/2006 | Suzuki et al. | 310/71 |
| 7,196,443 B2 * | 3/2007 | Kimura et al. | 310/71 |
| 2003/0200761 A1 | 10/2003 | Funabashi et al. | |
| 2004/0108779 A1 | 6/2004 | Boettger et al. | |
| 2005/0223727 A1 | 10/2005 | Funabashi et al. | |
| 2006/0064998 A1 | 3/2006 | Funabashi et al. | |

FOREIGN PATENT DOCUMENTS

| | | | |
|---|---|---|---|
| JP | 05-058267 | | 8/1993 |
| JP | 3007182 U | | 2/1995 |
| JP | 07-298543 | | 11/1995 |
| JP | 7-298543 A | | 11/1995 |
| JP | 07298543 A | * | 11/1995 |
| JP | 2002-101597 A | | 4/2002 |
| JP | 2003-324903 A | | 11/2003 |

OTHER PUBLICATIONS

International Search Report (PCT/ISA/210) issued on May 15, 2007, by Japanese Patent Office as the International Searching Authority for International Application No. of PCT/JP2007/058489.

Substantive Examination Adverse Report issued in the corresponding Malaysian Patent Application No. PI 20080704 dated Dec. 15, 2009.

International Preliminary Report on Patentability and the Written Opinion of the International Searching Authority (Forms PCT/IB/373 and PCT/ISA/237) issued in corresponding International Application No. PCT/JP2007/058489 dated Nov. 10, 2009.

Office Action issued in the corresponding Japanese Patent Application No. 2007-528903 dated Apr. 27, 2010, and an English Translation thereof.

* cited by examiner

MOTOR, PUMP, AND METHOD OF MANUFACTURING THE MOTOR

CROSS-REFERENCE TO RELATED APPLICATIONS

This application is a divisional of U.S. application Ser. No. 12/067,862 filed on Mar. 24, 2008, which is a U.S. national stage application of International Application No. PCT/JP2007/058489 filed on Apr. 19, 2007, the entire contents of which is incorporated herein by reference.

TECHNICAL FIELD

The present invention relates to a motor equipped with a cooling fan, and particularly to the streamlining of motor assembly process.

BACKGROUND ART

A molded motor and manufacture thereof that is designed to obtain a structure for high performance mold motor at low cost has been proposed (See e.g. Patent Document 1). A stator core is applied with a coil of a resin coated wire, e.g. an enamel wire. A lead wire of the coil is connected, at the end thereof, with a terminal. A terminal block previously molded of an easily machinable resin is secured, together with the stator core applied with the coil, to a metal mold for molding the outer frame and molded, integrally with the outer frame, of a molding resin, e.g. an epoxy resin, mixed with a filler. The terminal is secured to the terminal block by means of a fixing screw. The terminal block is provided, on the outside of the outer frame, with a metal part short-circuited electrically through an earth screw part penetrating the terminal block and thereby the insulation test can be performed easily and the reliability is enhanced.
Patent Document 1: JP7-298543A

DISCLOSURE OF THE INVENTION

Problems to be Solved by the Invention

The molded motor described in the Patent Document 1, however, is provided with neither a foot plate mounting portion in which to mount a foot plate nor a condenser assembly box mounting portion in which to mount a condenser assembly box. A problem is that additional parts are required for incorporating a foot plate and a condenser assembly box into a molded motor. As a result, low cost production of the molded motor is not allowed.

Another problem is that a fan cover, the condenser assembly box, and the foot plate are to be incorporated separately into the molded stator. As a result, the parts costs and the processing costs are raised.

This invention is directed to solve problems such as those described above. It is an object of the invention to provide a motor, a pump, and a method of manufacturing the motor which are capable of reducing the parts costs and the processing costs, by assembling a fan cover, a condenser assembly box and a foot plate into a molded stator without additional parts for fixing.

Means to Solve Problems

A motor, which has a stator molded of a thermosetting resin, according to this invention is characterized in that the stator molded may include a foot plate mounting portion where a foot plate is mounted, and further in that prepared holes for screw fixing for fixing the foot plate may be exposed from a mold surface at the foot plate mounting portion.

The motor according to this invention is characterized by including a foot plate mounting part that may have a plurality of screw fixing portions connected via narrow bridges where the screw fixing portions may include prepared holes for screw fixing, and in that the foot plate mounting part may be molded together with the stator, and further in that the prepared holes may be exposed from the mold surface.

The motor according to this invention is characterized by including a plurality of insert nuts with screw holes, and in that the insert nuts may be molded together with the stator, and further in that the screw holes may be exposed from the mold surface.

A motor, which has a stator molded of a thermosetting resin, according to this invention is characterized in that the stator molded may include a condenser assembly box mounting portion where a condenser assembly box that incorporates a condenser may be mounted, and further in that a lead wire outlet portion and prepared holes for screw fixing of the condenser assembly box may be exposed from a mold surface at the condenser assembly box mounting portion.

The motor according to this invention is characterized by including a fan cover, and in that the foot plate and the fan cover may be fastened together to be fixed to the stator molded at the foot plate mounting portion.

The motor according to this invention is characterized by including a fan cover, and in that the condenser assembly box and the fan cover may be fastened together to be fixed to the stator molded at the condenser assembly box mounting portion.

The motor according to this invention is characterized by including a fan cover, and in that the foot plate and the fan cover may be fastened together to be fixed to the stator molded at the foot plate mounting portion, and further in that the condenser assembly box and the fan cover may be fastened together to be fixed to the stator molded at the condenser assembly box mounting portion.

The motor according to this invention is characterized by including a fan cover, and in that the fan cover may be fixed to the foot plate at a fan cover mounting portion that is formed on the foot plate by bending an edge of the foot plate, after the foot plate is incorporated into the stator molded at the foot plate mounting portion.

The motor according to this invention is characterized by including a fan cover, and in that the fan cover may be fixed to the foot plate at a fan cover mounting portion that is formed on the foot plate by bending an edge of the foot plate, after the foot plate is incorporated into the stator molded at the foot plate mounting portion, and further in that the condenser assembly box and the fan cover may be fastened together to be fixed to the stator molded at the condenser assembly box mounting portion.

The motor according to this invention is characterized in that the fan cover may include a bent portion at an edge of an opening of the fan cover, and further in that the bent portion may be engaged with the condenser assembly box mounting portion to be fixed temporarily, and still further in that the condenser assembly box and the fan cover may be incorporated into the stator molded.

The motor according to this invention is characterized in that the stator may include a stator core, which may be earthed by means of an earth wire, and further in that one of the prepared holes for screw fixing at the foot plate mounting portion may further be processed to reach an outer surface of the stator core, and still further in that the earth wire may be applied to a screw to be inserted into the one of the prepared holes further processed.

A pump according to this invention is characterized by including the motor mentioned above.

A method of manufacturing a motor according to this invention is characterized by including:

a) producing a stator, and in parallel, molding a foot plate assembly part, in a first step;

b) molding the stator together with the foot plate assembly part by resin molding to form a molded stator, in a second step;

c) drilling one of prepared holes for mounting a foot plate to reach a stator core, and in parallel, producing a rotor assembly and a bracket, in a third step;

d) incorporating the rotor assembly, the bracket, and a spring washer into the molded stator, and in parallel, molding a cooling fan, in a fourth step;

e) incorporating the cooling fan into a shaft, at a protruding portion from the molded stator, of the rotor assembly by means of a C ring, and in parallel, molding a fan cover and producing the foot plate, in a fifth step;

f) fastening together and incorporating the foot plate and the fan cover into the molded stator, in a sixth step;

g) fixing the fan cover temporarily to the molded stator, and in parallel, molding a condenser assembly box, and producing an earth wire, in a seventh step;

h) fastening together and incorporating the condenser assembly box and the fan cover into the molded stator, and in parallel, incorporating the earth wire into the molded stator together with a screw for assembly of the foot plate, in an eighth step; and i) connecting a lead wire drawn out from a lead wire outlet portion formed on the molded stator and a condenser contained in the condenser assembly box, and thereby assembling the motor, in a ninth step.

EFFECTS

According to a motor of this invention, thus formed, a fan cover, a condenser assembly box, and a foot plate may be incorporated into a molded stator without additional parts for fixing, and thereby the parts costs and the processing costs may be reduced.

BEST MODE FOR IMPLEMENTING THE INVENTION

Embodiment 1

A first embodiment is illustrated in FIG. 1 to FIG. 5. FIG. 1 shows a perspective view of a stator 100. FIG. 2 shows a perspective view of a modified example of the stator 100. FIG. 3 shows an exploded perspective view of a motor 200. FIG. 4 shows a cross section of the motor 200. FIG. 5 shows a chart illustrating a manufacturing process of the motor 200.

First, a structure of the stator 100 is described with reference to FIG. 1. The stator 100 shown in FIG. 1 is a stator of a single-phase induction motor, as an example of a motor. In this embodiment, a description will be given with reference to the stator of the single-phase induction motor as an example. A stator core 1 is formed by punching 0.35-0.5 mm thick magnetic steel plates and layering punched magnetic steel plates by caulking, welding, etc.

The end surface insulating plates 44, molded of a thermoplastic resin, such as a polybutylene terephthalate (PBT), are incorporated into the stator core 1 on both axial end surfaces.

The end surface insulating plates 44 are shaped like a donut, like the stator core 1. The diameter of the end surface insulating plate 44 is a little larger than the diameter of the stator core 1. The end surface insulating plate 44 has slot-like cutouts (not shown in FIG. 1) formed on the inner peripheral side. The slot-like cutouts have a similar shape to slots formed on the stator core 1 (with only their openings, where coils are placed, on the inner peripheral side of the stator core 1 shown in FIG. 1). The slot-like cutouts are a little larger in size than the slots.

In the slots of the stator core 1 are slot cells as insulating members for insulation from the slots, and coils (magnet wires) inserted.

The stator winding of the single-phase induction motor includes a main winding and an auxiliary winding. The main winding and the auxiliary winding are connected to lead wires 4. The lead wires 4 are connected to a power source to supply power to the main winding and the auxiliary winding. The stator of the single-phase induction motor uses three of the lead wires 4 in total, i.e., two to be connected to coil terminals and one to be connected to a protector. A lead wire outlet part 3 gathers the three lead wires 4 together and is incorporated into the stator core 1.

Wedges 42 prevent leakage of coils inserted in the stator core 1 to the inner peripheral side from the slot openings of the stator core 1. The wedges 42 also insulate between the coils and teeth end portions (on the inner peripheral side) of the stator core 1.

Binding strings 41 secure coil terminals 2 in place. The binding strings 41 are wound around the whole of the outside of the stator core 1, both of the coil terminals 2, and the slots (on the outside of the wedges 42).

A protector protecting part 43 that contains the protector for protecting the motor is bound to one of the coil terminals 2 that extend out from the stator core 1 on the both sides in the axial direction.

The lead wire outlet part 3 molded of a thermoplastic resin, such as a polybutylene terephthalate (PBT), is placed on the periphery of one of the end surfaces of the stator core 1. The lead wires 4 to be connected by wire to the outside of the stator 100 are exposed from a mold surface of the stator 100 molded via an exposed portion of the lead wire outlet part 3 from the mold surface. Portions surrounding prepared holes 5a that are formed on a condenser assembly box mounting portion 5 (See FIG. 3) is exposed from the mold surface, after the stator 100 is molded. This may allow for incorporation of a condenser assembly box 25 (See FIG. 3) by means of tapping screws without the involvement of additional parts. This may result in reducing the parts costs.

The lead wire outlet part 3 includes the condenser assembly box mounting portion 5 having the prepared holes 5a for tapping screws (See FIG. 3). The condenser assembly box mounting portion 5 will be described later in detail.

A foot plate mounting part 6 for mounting a foot plate 19 (See FIG. 3) is fixed to the stator core 1 by molding on the opposite side of where the lead wire outlet part 3 is mounted on the outer surface of the stator core 1.

The foot plate mounting part 6 is molded of a thermoplastic resin, such as a polybutylene terephthalate (PBT). As shown in FIG. 1, the foot plate mounting part 6 includes a plurality (four pieces in the example of FIG. 1) of screw fixing portions 6a with prepared holes 8 for tapping screws for mounting the foot plate 19, connected by narrow bridges 6b. The screw fixing portion 6a has a tapered shape, with a circular base of a foot plate installation surface 6c increased in thickness towards an opposite surface 6d. This is designed to prevent the screw fixing portions 6a from falling out, after the foot plate mounting part 6 is molded together with the stator 100. The screw fixing portion 6a is formed to include protrusions 7 for preventing the foot plate mounting part 6 from rolling. The opposite surface 6d to the foot plate installation surface 6c is curved according to the outer surface of the stator core 1. The screw fixing portions 6a are thus connected by the narrow bridges 6b, and thereby the foot plate mounting part 6 may be set into a metal mold on a first try. This may result in reducing the processing costs.

A modified example of the stator 100 is now described with reference to FIG. 2. The stator 100 of FIG. 1, which employs the foot plate mounting part 6 for mounting the foot plate 19, may be modified by that of FIG. 2 that uses metal insert nuts 9 as a replacement of the foot plate mounting part 6. The metal insert nuts 9 include protrusions 10 sticking out from the outer surfaces for stopping them falling out or rolling. The example of FIG. 2 shows four pieces of the insert nuts 9 involved. The insert nuts 9 each have a screw hole 9a.

Modifications in the type or in the mounting position of the foot plate mounting part 6 or the insert nuts 9 may be handled by corresponding modifications in the mounting part of the foot plate mounting part 6 or the insert nuts 9 of metal mold.

FIG. 3 shows a molded stator 11, of a molding resin 45 of a thermosetting resin, which is formed by molding the stator 100 integrally with the foot plate mounting part 6 or the insert nuts 9 that are set in a predetermined position on the opposite side of where the lead wire outlet part 3 is on the outer surface of the stator 100.

As shown in FIG. 3, the molded stator 11 is formed to include the condenser assembly box mounting portion 5 and a foot plate mounting portion 13. A lead wire outlet portion 3a of the lead wire outlet part 3, the portions surrounding the prepared holes 5a of the condenser assembly box mounting portion 5, and the foot plate installation surfaces 6c of the foot plate mounting part 6 are exposed from the surface of the molding resin 45.

The stator 100 may be molded with the foot plate mounting part 6 pressed against the outer surface of the stator 100, and thereby the molding resin 45 may be prevented from leaking into the foot plate installation surface 6c. This may result in enhancing the quality of the molded stator 11.

In order to incorporate an earth wire 29, at least one of the prepared holes 8 for tapping screws exposed, from the surface of the molded stator 11 at the foot plate mounting portion 13 is processed further to reach (penetrate through) the outer surface of the stator core 1. Details of this will be descried later.

As shown in FIG. 3, a rotor assembly 50 assembled with a rotor 15, a shaft 40 and (two pieces of) bearings 16 is incorporated, together with a bracket 17, into the molded stator 11 where a spring washer 14 is inserted. The bracket 17 is fixed by means of (four pieces, in the case of FIG. 3, of) screws for assembly 31 of the bracket inserted into screw holes 18a formed on leg portions 18 via holes 12a formed on leg portions 12 of the molded stator 11.

A cooling fan 21 for cooling the motor 200 is molded of a thermoplastic resin, such as a polyamide (PA), and formed with a plurality (eight pieces in the case of FIG. 3) of vanes 21a connected by narrow bridges 21b. The cooling fan 21 is incorporated into the shaft 40, at a protruding portion from the molded stator 11, of the rotor assembly 50 previously incorporated into the molded stator 11, by means of a C ring 28.

The foot plate 19 is formed by sheet metal press molding. The foot plate 19 includes (four pieces, in the case of FIG. 3, of) mounting holes 19a, which correspond to the prepared holes 8 for mounting the foot plate, exposed from the surface of the molded stator 11 at the foot plate mounting portion 13, and fixing holes 19b for the motor 200. It is also possible to have a fan cover mounting portion 20 that is formed by lifting (bending) parts of a molded stator installation surface 19c of the foot plate 19 to stand perpendicular to the molded stator installation surface 19c, and forming screw holes 20a.

As shown in FIG. 3, a fan cover 22 to be incorporated into the molded stator 11 is molded of a thermoplastic resin, such as a polyamide (PA). The fan cover 22 protects the cooling fan 21. The fan cover 22 has a thin dome-like structure provided with an air intake 34. A part of the side surface of the fan cover 22 in the vicinity of an opening thereof (on the opposite side of the air intake 34) is cut out to create a flat surface. The cut-out flat surface includes a condenser assembly box mounting portion 33 for the fan cover 22. A foot plate mounting portion 22a is also formed on an opposite surface to the condenser assembly box mounting portion 33 (See FIG. 4).

The condenser assembly box mounting portion 33 includes a hole 23, mounting holes 24, and bent portions 35. The hole 23 receives a protrusion 26 formed on the condenser assembly box 25 to be fitted. The mounting holes 24 correspond to the prepared holes 5a exposed from the surface of the condenser assembly box mounting portion 5 of the molded stator 11 for mounting the condenser assembly box 25. The bent portions 35 are formed by bending parts of the edge of the opening of the fan cover 22 inwards and perpendicularly to the surface of the condenser assembly box mounting portion 33.

The foot plate mounting portion 22a of the fan cover 22 (See FIG. 4) includes mounting holes (not shown in the figure) corresponding to the prepared holes 8 for mounting the foot plate of the foot plate mounting part 6, integrally molded with the molded stator 11 at the foot plate mounting portion 13, and mounting holes (not shown in the figure) corresponding to the screw holes 20a formed at the fan cover mounting portion 20 on the foot plate 19.

The foot plate 19 is incorporated into the molded stator 11 by inserting screws for assembly 30 of the foot plate 19 into the prepared holes 8, exposed from the surface of the foot plate mounting portion 13, via the mounting holes 19a on the foot plate 19. When the stator core 1 is not earthed, then the foot plate 19 is incorporated by means of four pieces of the screws for assembly 30 of the foot plate. FIG. 3 shows a case where the stator core 1 is earthed. This case uses three pieces of the screws for assembly 30 of the foot plate and a screw for assembly 37 of the foot plate for the incorporation of the earth wire 29. One of the prepared holes 8 formed on the foot plate mounting portion 13 on the molded stator 11 is further processed to reach the outer surface of the stator core 1 as a prepared hole 36 (See FIG. 4). The screw for assembly 37 of the foot plate for the incorporation of the earth wire 29 is formed to touch the stator core 1 at its tip when a terminal 29a of the earth wire 29 is incorporated and the foot plate 19 is fixed by screw (See FIG. 4). This makes it possible to take out the earth wire 29 of the stator core 1 when the foot plate 19 is incorporated. The stator core 1 may thus be earthed without requiring additional parts, and thereby allowing the parts costs to be reduced.

When the fan cover mounting portion 20 is not formed on the foot plate 19, then mounting holes (not shown in the figures) corresponding to the prepared holes 8 for mounting the foot plate, which are formed at the foot plate mounting portion 13 on the molded stator 11, may be provided, which allows the fan cover 22 to be incorporated into the molded stator 11 together with the foot plate 19.

As shown in FIG. 3, when the fan cover mounting portion 20 is formed on the foot plate 19, then the fan cover 22 is screwed into mounting holes (not shown in the figures) corresponding to the screw holes 20a formed at the fan cover mounting portion 20 on the foot plate 19 and thus incorporated into the molded stator 11, after the foot plate 19 is incorporated into the molded stator 11.

The fan cover 22 is further fixed temporarily to the molded stator 11 by the bent portions 35, formed at the edge of the opening of the fan cover 22, being engaged with the condenser assembly box mounting portion 5 of the lead wire outlet part 3 that is exposed from the surface of the molded stator 11. Specifically, the bent portions 35 are engaged with protrusions that form the prepared holes 5a at the condenser assembly box mounting portion 5 (See FIG. 4).

The condenser assembly box 25 is molded of a thermoplastic resin such as a polypropylene (PP). As shown in FIG. 4, the condenser assembly box 25 is incorporated into the molded stator 11 by being screwed into the prepared holes 5a exposed from the surface of the condenser assembly box mounting portion 5 of the molded stator 11 via mounting holes (not shown in the figures) formed on the condenser assembly box 25, by means of (two pieces of) screws for assembly 32 of the condenser assembly box, after the condenser 27 is incorporated into the condenser assembly box 25.

The fan cover 22 fixed temporarily to the molded stator 11 is then also screwed together with the condenser assembly box 25, and thus secured to the molded stator 11. Thus, the condenser assembly box 25 is screwed together with the fan cover 22, and the foot plate 19 is also screwed together with the fan cover, which requires no additional parts. This may result in reducing the parts costs.

The following procedures may implement a structure to allow the mounting hole 24 on the fan cover 22, the mounting hole (not shown in the figures) on the condenser assembly box 25, and the prepared hole 5a at the condenser assembly box mounting portion 5 formed on the molded stator 11 to meet via the condenser assembly box 25. This may facilitate the screw fixing of the condenser assembly box 25 and the fan cover 22, and thereby result in reducing the process costs.

(1) The fan cover 22 may be mounted as follows: the bent portions 35 formed at the edge of the opening of the fan cover 22 are engaged with the condenser assembly box mounting portion 5 of the lead wire outlet part 3, exposed from the surface of the molded stator 11, thereby fixing the fan cover 22 temporarily to the molded stator 11.

(2) The condenser assembly box 25 may be incorporated as follows: the protrusion 26 formed on the condenser assembly box 25 is fitted into the hole 23 formed on the fan cover 22.

Note that when the motor 200 of this embodiment runs, then the cooling fan 21 rotates accordingly. Air sucked in from the air intake 34 of the fan cover 22 is blown to the outer surface of the molded stator 11, thereby cooling the molded stator 11.

The motor 200 of this embodiment is assembled by connecting the lead wires 4 drawn out from the lead wire outlet portion 3a of the molded stator 11, and the condenser 27 contained in the condenser assembly box 25.

A manufacturing process of the motor 200, equipped with a cooling fan, according to this embodiment is now described with reference to FIG. 5.

(1) STEP 1: The stator 100 is produced. In parallel to this, the foot plate mounting part 6 is molded.
(2) STEP 2: The stator 100 is molded by resin molding together with the foot plate mounting part 6 to form the molded stator 11.
(3) STEP 3: One of the prepared holes 8 for mounting the foot plate 19 is drilled further to reach the stator core 1. In parallel to this, the rotor assembly 50 and the bracket 17 are produced.
(4) STEP 4: The rotor assembly 50, the bracket 17, the spring washer 14, etc. are incorporated into the molded stator 11. In parallel to this, the cooling fan 21 is molded.
(5) STEP 5: The cooling fan 21 is incorporated into the shaft 40, at a protruding portion thereof from the molded stator 11, of the rotor assembly 50 previously incorporated into the molded stator 11, by means of the C ring 28. In parallel to this, the fan cover 22 is molded, and the foot plate 19 is produced.
(6) STEP 6: The foot plate 19 and the fan cover 22 are fastened together and incorporated into the molded stator 11.
(7) STEP 7: The fan cover 22 is temporarily fixed to the molded stator 11. In parallel to this, the condenser assembly box 25 is molded, and the earth wire 29 is produced.
(8) STEP 8: The condenser assembly box 25 and the fan cover 22 are fastened together and incorporated into the molded stator 11. The earth wire 29 is also incorporated into the molded stator 11 together with the screw 37 for assembly of the foot plate for incorporation of the earth wire 29.
(9) STEP 9: The lead wires 4 drawn out from the lead wire outlet portion 3a of the molded stator 11 and the condenser 27 contained in the condenser assembly box 25 are connected by wire, and thereby the motor 200 is assembled.

The manufacturing process illustrated in FIG. 5 may allow for producing the motor 200, equipped with the cooling fan 21, with improved manufacturing efficiency.

The motor 200 of this embodiment may be used as a drive unit in a pump, for example. This may result in reducing the parts costs and the processing costs.

Figure 1:
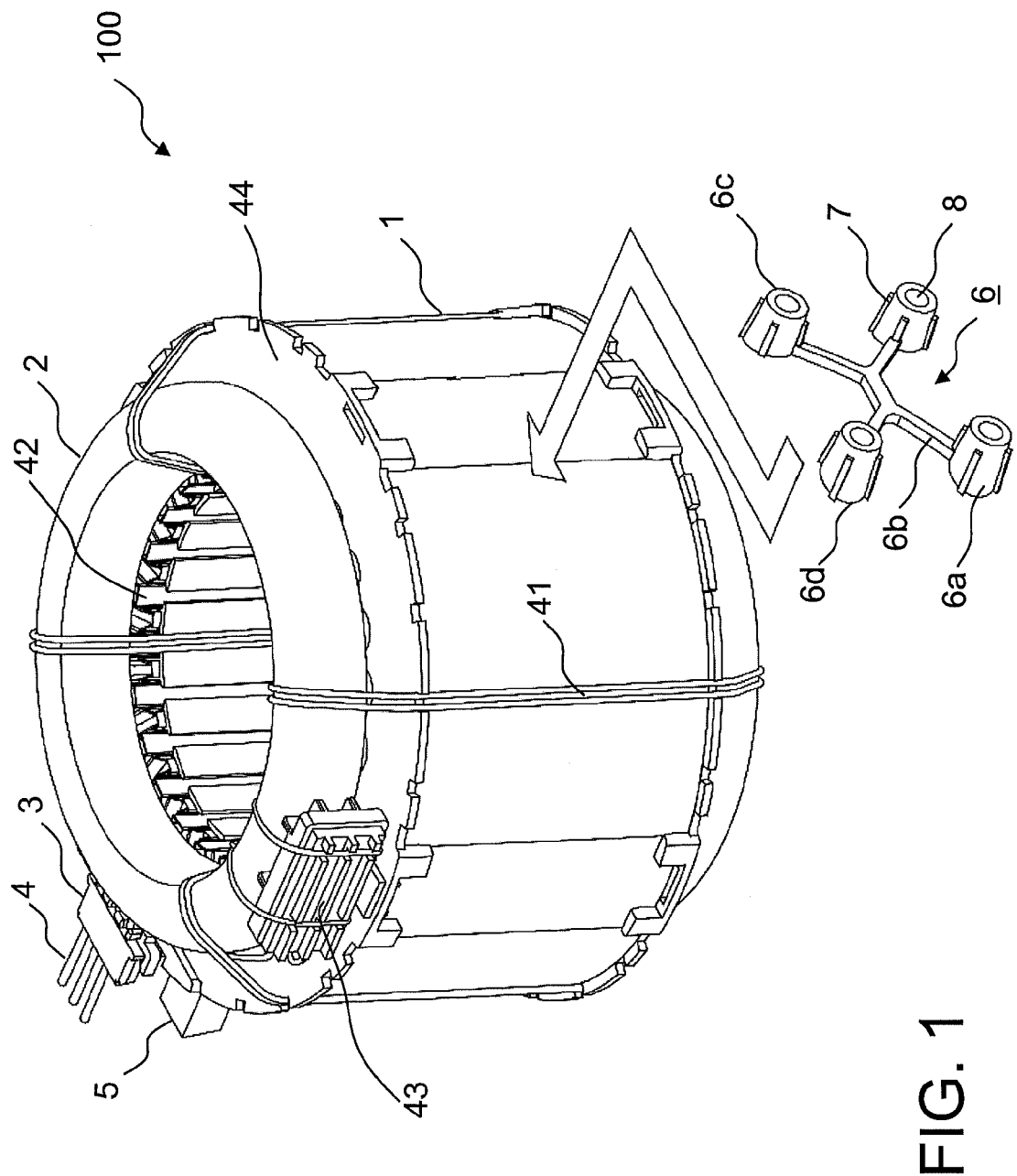
[FIG. 1] It is a diagram illustrating a first embodiment, which shows a perspective view of a stator 100.
Figure 2:
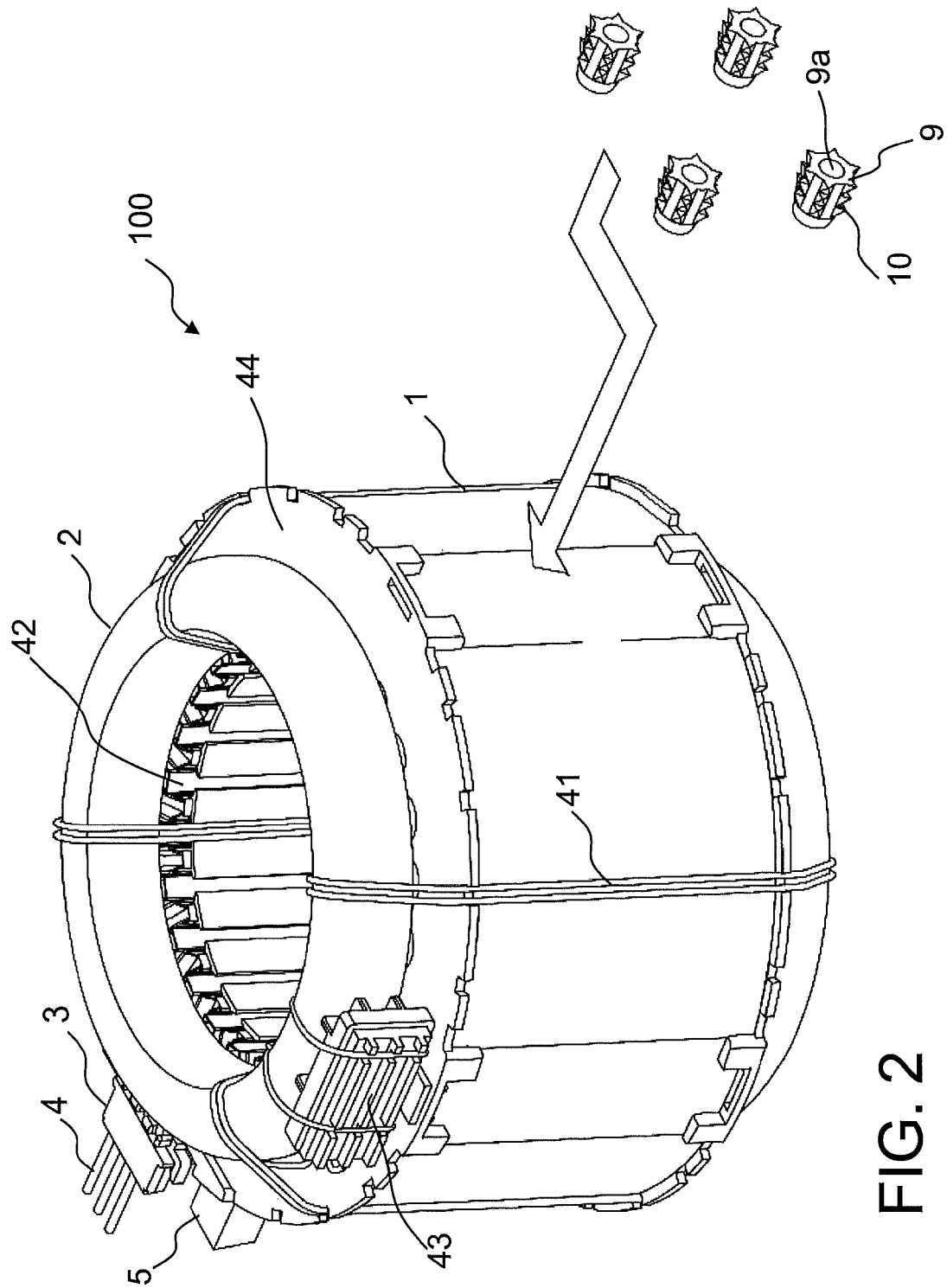
[FIG. 2] It is a diagram illustrating the first embodiment, which shows a perspective view of a modified example of the stator 100.
Figure 3:
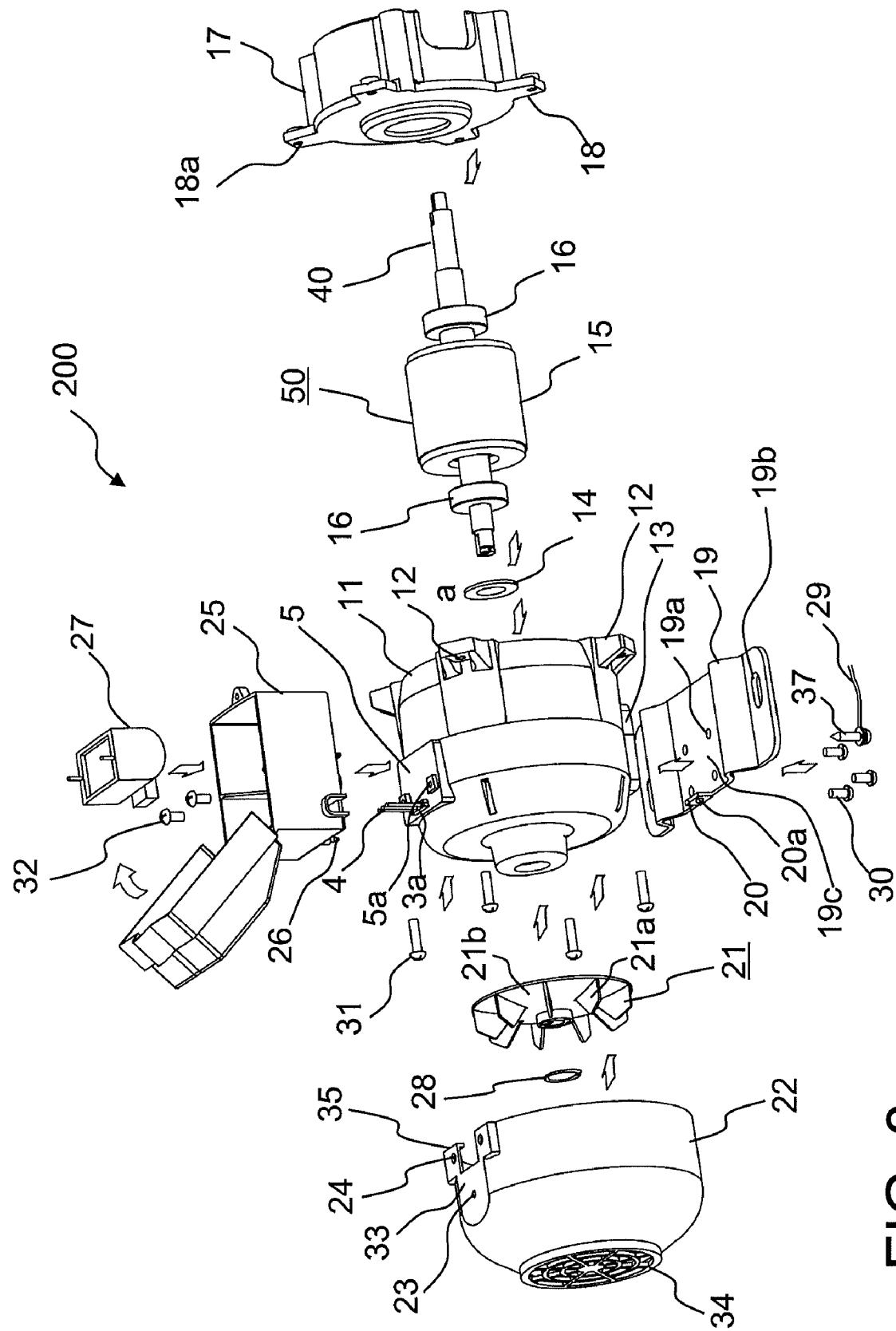
[FIG. 3] It is a diagram illustrating the first embodiment, which shows an exploded perspective view of a motor 200.
Figure 4:
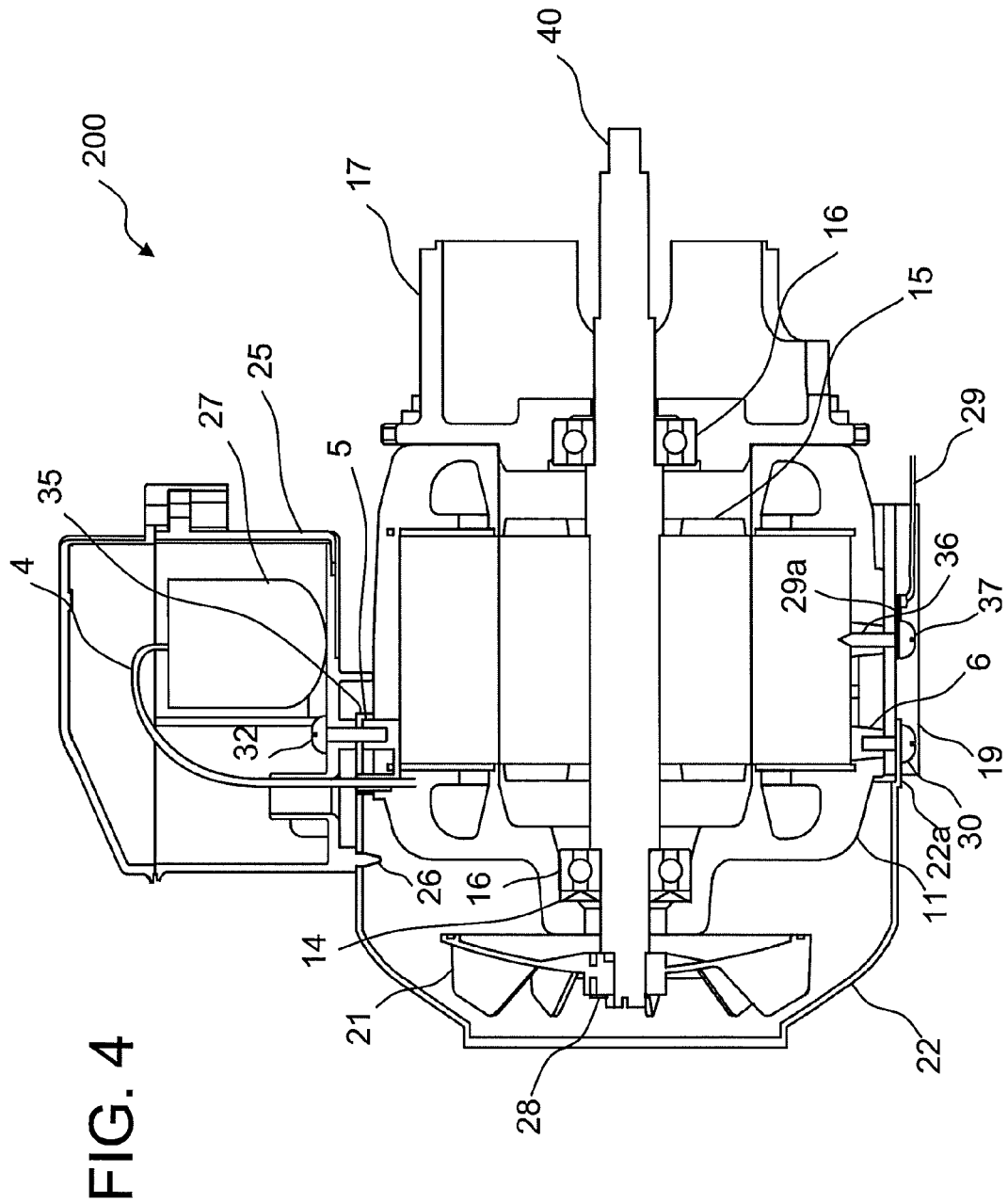
[FIG. 4] It is a diagram illustrating the first embodiment, which shows a cross section of the motor 200.
Figure 5:
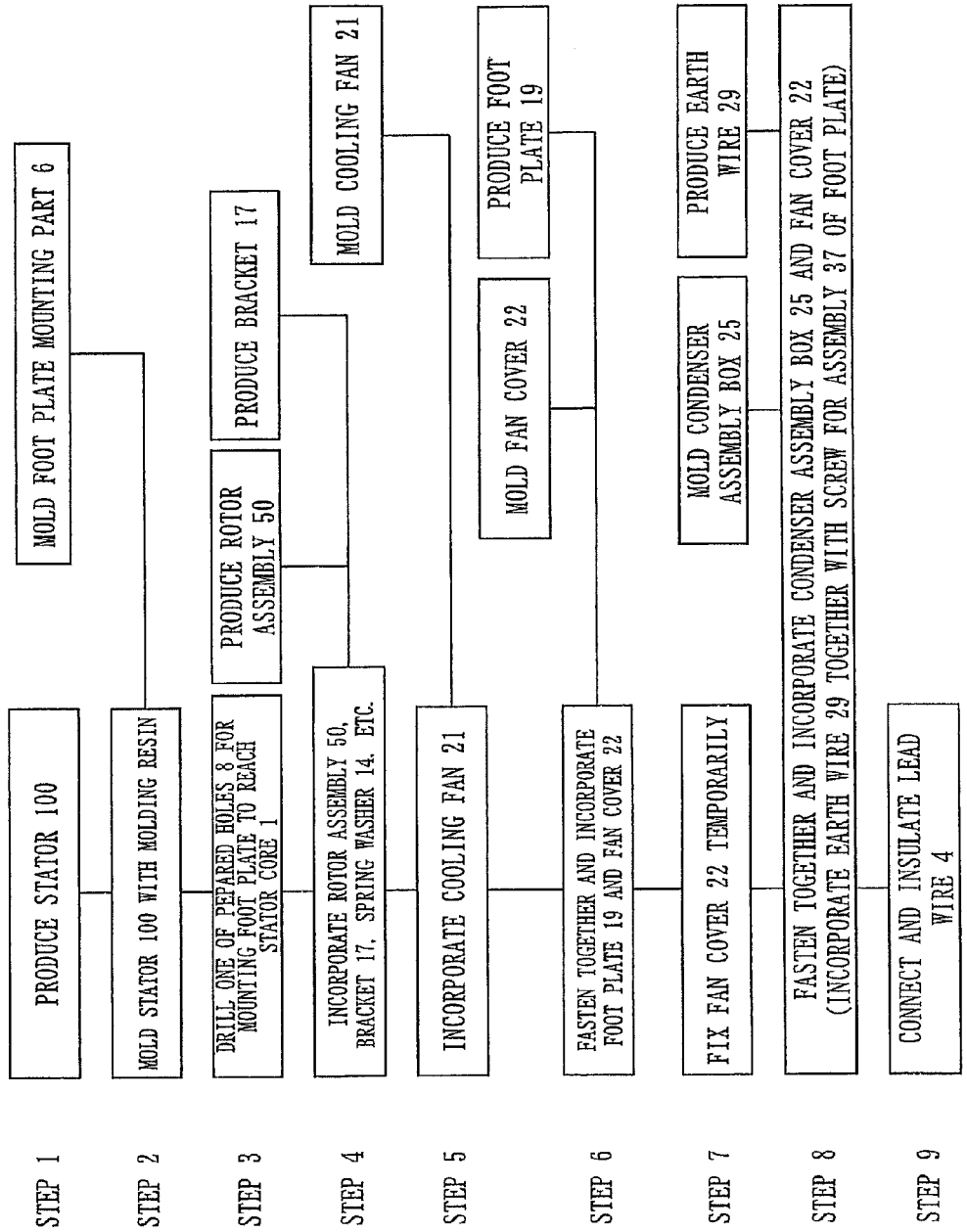
[FIG. 5] It is a diagram illustrating the first embodiment, which shows a manufacturing process of the motor 200.

EXPLANATION OF REFERENCE NUMERALS 1 stator core
2 coil end portion
3 wire lead outlet part
3a wire lead outlet portion
4 wire lead
5 condenser assembly box mounting portion
5a prepared hole
6 foot plate mounting part
6a screw fixing portion
6b narrow bridge
6c foot plate installation surface
6d opposite surface
7 protrusion
8 prepared hole
9 insert nut
9a screw hole
10 protrusion 11 molded stator
12 leg portion
12a hole
13 foot plate mounting portion
14 spring washer
15 rotor
16 bearing
17 bracket
18 leg portion
18a screw hole
19 foot plate
19a mounting hole
19b fixing hole for a motor 200
19c molded stator installation surface
20 fan cover mounting portion
20a screw hole
21 cooling fan
21a vane
21b narrow bridge
22 fan cover
23 hole
24 mounting hole
25 condenser assembly box
26 protrusion
27 condenser
28 C ring
29 earth wire
30 screw for assembly of a foot plate
31 screw for assembly of a bracket
32 screw for assembly of a condenser assembly box
33 condenser assembly box mounting portion
34 air intake
35 bent portion
36 further processed prepared hole
37 screw for assembly of a foot plate for incorporation of an earth wire 29
40 shaft
41 binding string
42 wedge
43 protector protecting part
44 end surface insulating plate
50 rotor assembly
100 stator
200 motor

The invention claimed is:

1. A motor having a stator molded of a thermosetting resin, the molded stator comprising:
a condenser assembly box mounting portion for mounting a condenser assembly box that incorporates a condenser,
wherein the condenser assembly box mounting portion includes a lead wire outlet portion and prepared holes for screw fixing of the condenser assembly box, being exposed from a mold surface.

2. A motor having a stator molded of a thermosetting resin, the molded stator comprising:
a foot plate mounting portion for mounting a foot plate, the foot plate for mounting the motor,
wherein the foot plate mounting portion includes prepared holes for screw fixing of the foot plate, the prepared holes being exposed from a mold surface; and
a condenser assembly box mounting portion for mounting a condenser assembly box that incorporates a condenser,
wherein the condenser assembly box mounting portion includes a lead wire outlet portion and prepared holes for screw fixing of the condenser assembly box, being exposed from the mold surface.

3. A motor having a stator molded of a thermosetting resin, the molded stator comprising:
a foot plate mounting portion for mounting a foot plate, the foot plate for mounting the motor,
wherein the foot plate mounting portion includes prepared holes for screw fixing of the foot plate, the prepared holes being exposed from a mold surface;
a foot plate mounting part that includes a plurality of screw fixing portions connected via narrow bridges, the screw fixing portions including prepared holes for screw fixing,
wherein the foot plate mounting part is molded together with the stator, with the prepared holes being exposed from the mold surface; and
a condenser assembly box mounting portion for mounting a condenser assembly box that incorporates a condenser,
wherein the condenser assembly box mounting portion includes a lead wire outlet portion and prepared holes for screw fixing of the condenser assembly box, being exposed from the mold surface.

4. A pump having the motor according to claim 1.

* * * * *